United States Patent [19]
Eda

[11] Patent Number: 5,289,302
[45] Date of Patent: Feb. 22, 1994

[54] ACCESS METHOD FOR OPTICAL LOCAL AREA NETWORK SYSTEMS

[75] Inventor: Masahiro Eda, Tokyo, Japan

[73] Assignee: NEC Corporation, Tokyo, Japan

[21] Appl. No.: 814,466

[22] Filed: Dec. 30, 1991

[30] Foreign Application Priority Data

Dec. 28, 1990 [JP] Japan .................................. 2-416929

[51] Int. Cl.$^5$ ........................ H04J 14/02; H04J 14/04
[52] U.S. Cl. .................................... 359/123; 359/124; 359/135; 359/165; 370/73; 370/76
[58] Field of Search .................... 370/69.1, 76, 71, 73, 370/50; 359/118, 125, 124, 133, 135, 165, 123

[56] References Cited

U.S. PATENT DOCUMENTS 4,797,879 1/1989 Habbab .............................. 359/123

FOREIGN PATENT DOCUMENTS 2214757 9/1989 United Kingdom .................. 370/73

OTHER PUBLICATIONS

R. M. Falconer et al, "Orwell: a protocol for an integrated services local network", Br. Telecom. Technol. J., vol. 3, No. 4, Oct. 1985, pp. 27–35.

Primary Examiner—Leslie Pascal
Attorney, Agent, or Firm—Sughrue, Mion, Zinn, Macpeak & Seas

[57] ABSTRACT

A supervisory node (2) and non-supervisory nodes (3 through 9) are connected in a loop by an optical transmission path (1). Over the loop (1) are transferred optical signals having wavelengths of λ1 through λ n. An access right control packet 10 is transferred in the loop at the optical wavelength of λ1. A node performing data transmission by line exchange writes its own node address (SA), the destination address (DA) and transmit reservation in the header of the access right control packet 10, and sends the packet out on the optical transmission path. The supervisory node 2 having received this access right control packet writes the wavelength to be used (λi) into the used wavelength field (UWL), and notifies the transmit and receive nodes of the choice of the wavelength. The transmit node sends data to the receive node by line exchange at the designated wavelength λi.

1 Claim, 8 Drawing Sheets

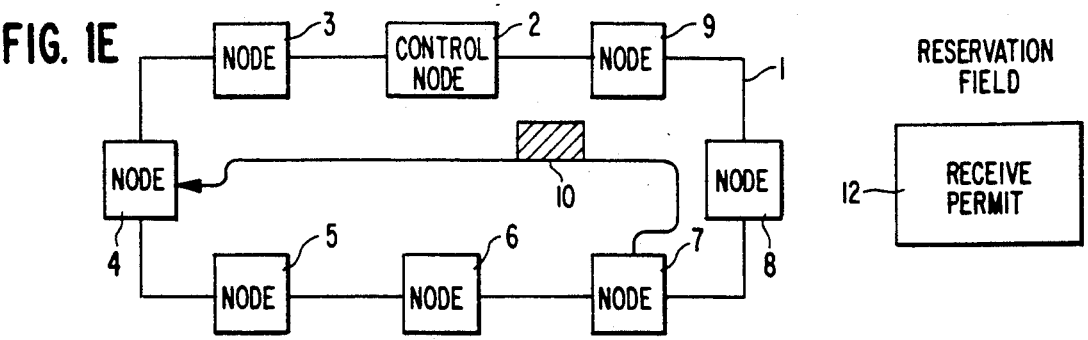
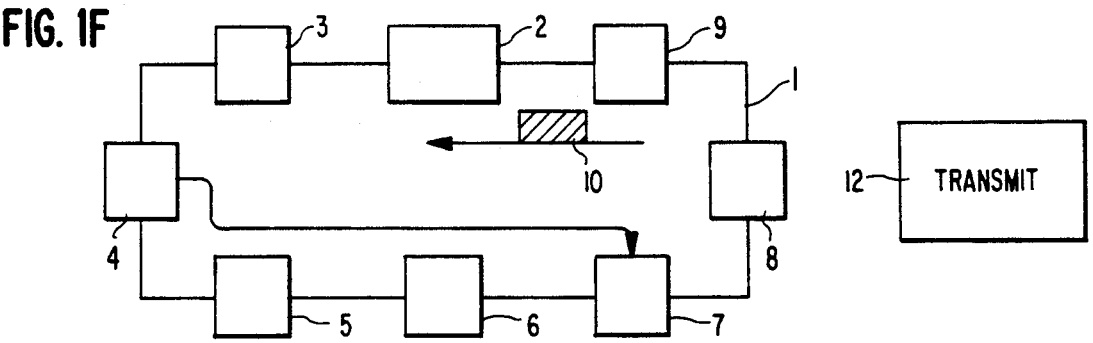
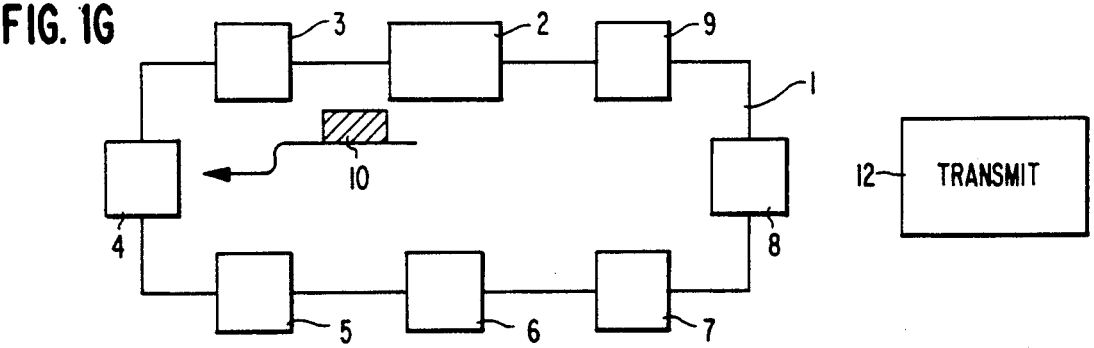
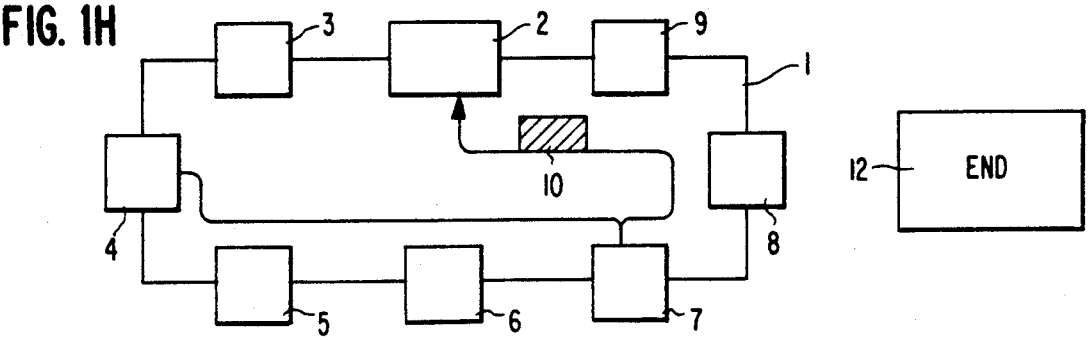

RSVF: RESERVATION FIELD
SA: SEND ADDRESS FIELD
DA: DESTINATION ADDRESS FIELD
UWL: USED WAVE LENGTH FIELD
ID: PACKET IDENTIFIER FIELD

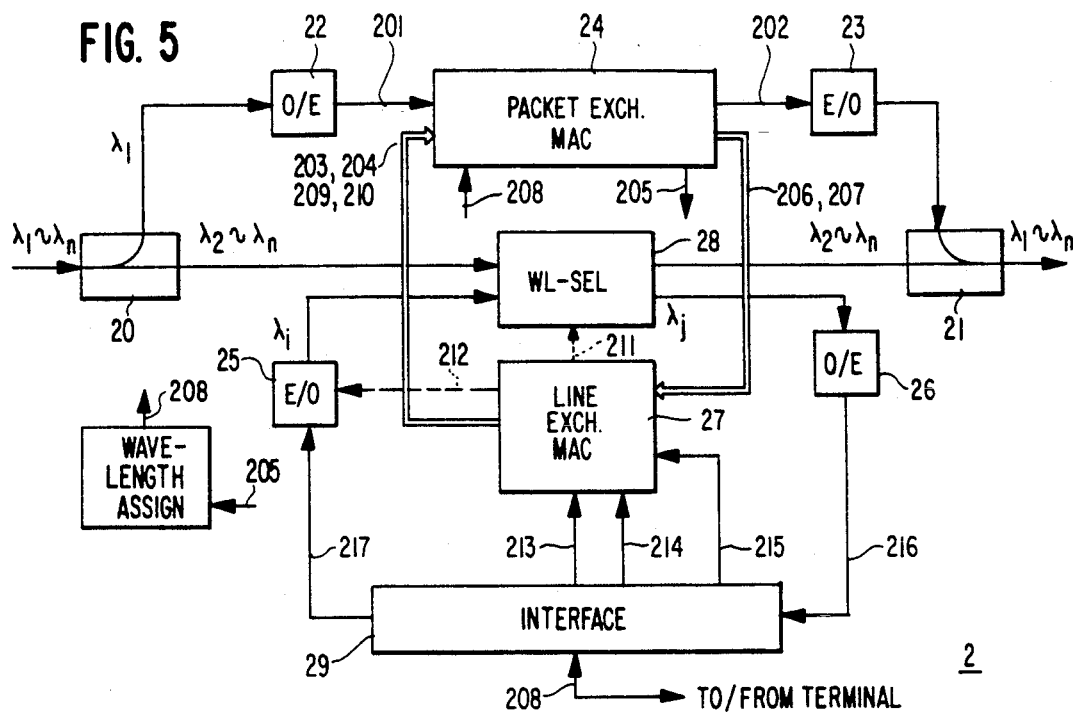
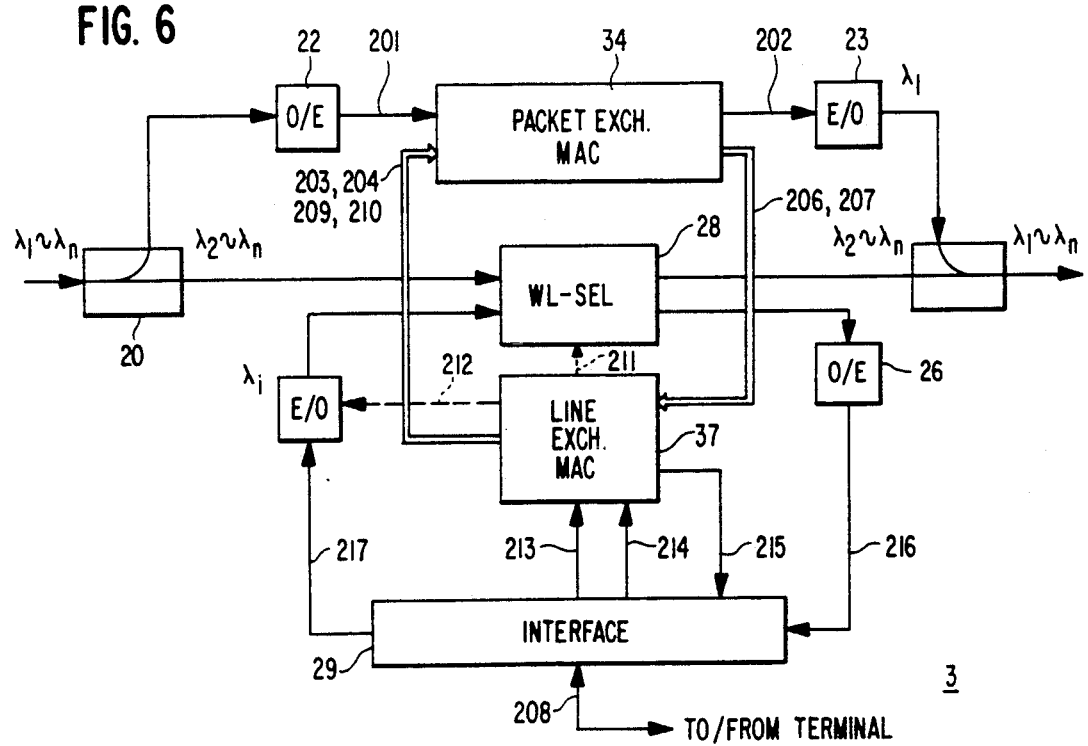

| WAVELENGTH 82 | I/B 83 | DESTINATION ADDRESS 84 | SEND ADDRESS 85 |
|---|---|---|---|
| $\lambda_2$ | B | | |
| $\lambda_3$ | I | | |
| | | | |
| $\lambda_j$ | B | | |
| $\lambda_{j+1}$ | I | | |
| | | | |
| $\lambda_N$ | I | | |

ACCESS METHOD FOR OPTICAL LOCAL AREA NETWORK SYSTEMS

BACKGROUND OF THE INVENTION

The present invention relates to a media access method for optical local area network (LAN) systems, and more particularly to a media access method combining packet exchange and line exchange by a wavelength-division multiplex method.

Signals transmitted over a transmission path from the transmitting side to the receiving side can be broadly classified into two categories. One comprises signals which require immediacy and interactivity, such as telephone signals and conference TV signals, and the other, signals which do not, such as data and computer programs. A network having an exchange function, such as a LAN, should desirably be able to handle both of these two categories of signals.

Meanwhile, the access method often used in a LAN is line exchange for the first category of signals, and packet exchange for the second. An optical LAN system integrating these line exchange and packet exchange methods is also known, referred to as the Fiber Distributed Data Interface II, or Or Well ring, which is described in the paper "Orwell; a protocol for an integrated services local area network" (Br Telecom J. Vol. 3, No. 4, October 1985, pp. 27-35.

This Orwell ring uses only one optical wavelength and a plurality of packets divided into packets for packet exchange and ones for line exchange. As a result, the transfer capacity of each group of packets is smaller than where packet exchange and line exchange are performed independently. Thus, in packet exchange, the throughput is reduced on account of a smaller number of packets that can be present on the system. In line exchange, the number of channels that can be taken is limited and, at the same time, the transmission rate per channel is considerably lower than the transmission rate of the system, making it impossible to transmit picture signals which require a high transmission rate.

SUMMARY OF THE INVENTION

An object of the present invention is to solve the aforementioned problems and to provide an access method for optical local area network (LAN) systems, which can ensure a large enough transmission capacity for line-exchanged signals and a high throughput for packet-exchanged signals.

According to a first aspect of the invention, there is provided a media access method for use in an optical LAN system having a plurality of nodes including a supervisory node and an optical fiber transmission path for data transmission between said nodes, and performing data transmission by a wavelength-division multiplex method using N optical wavelengths, wherein the transmission and reception of data takes place in the following manner:

an access right control packet, consisting of a reservation field in which is written transmit receive information indicating the presence of a data transmission request, a send address field in which is written a send node address, a destination address field in which is written a receive node address and a wavelength designation field in which is written used wavelength information for notifying the nodes of the optical wavelength to be used for data transmission, is transferred by a first optical wavelength between nodes including said supervisory node;

when a node is to transmit data, said supervisory node and said receive node are notified of the presence of a data transmission request by writing into said access right control packet said transmit reserve information, the send node's own address, and the address of the receive node to which the data are to be sent and sending the packet; and when said supervisory node, upon perception of said data transmission request from said node, selects one transmit optical wavelength out of the second through Nth optical wavelengths unless said receive node for which the data are to be sent is receiving data, writes the selected wavelength into said access right control packet as said used wavelength information, sends the packet, and thereby notifies said send and receive nodes of said transmit optical wavelength;

said send node transmits the data by said transmit optical wavelength of which it has been notified, said receive node takes only said transmit optical wavelength into itself but no other optical wavelengths and instead let them pass as optical signals.

According to a second aspect of the invention, there is provided a media access method for use in an optical LAN system according to the first aspect of the invention, wherein:

a packet exchanging packet, consisting of an identifier field, a send node address field, a receive node address field and a data section, and another packet exchanging packet, in whose identifier field are written information for distinguishing said access right control packet from said packet exchanging packet, are further transferred by said first optical wavelength;

each node receives, out of the packet exchanging packets having flowed into itself, a packet exchanging packet having a receive node address identical with its own node address; and when any node is to transmit packet exchanging data, it sends a packet exchanging packet in said send node address, said receive node address and said data section of which are respectively written the transmitting node's own address, the address of the destination node and the packet exchanging data to be transmitted.

BRIEF DESCRIPTION OF THE DRAWINGS

FIGS. 1A through 1J illustrate the flow of an access right control packet according to the media access method for use in an optical LAN system of the present invention;

FIG. 5 illustrates the configuration of a supervisory node;

FIG. 6 illustrates the configuration of ordinary nodes other than the supervisory node;

DESCRIPTION OF THE PREFERRED EMBODIMENTS

Figure 1A:
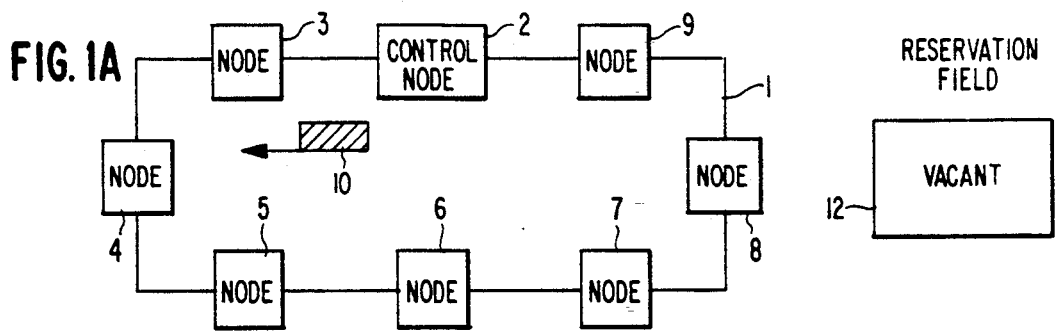
Figure 1B:
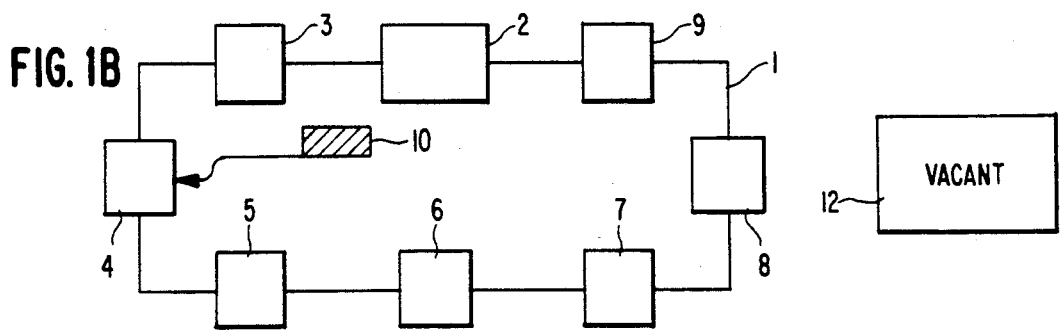
Figure 2:
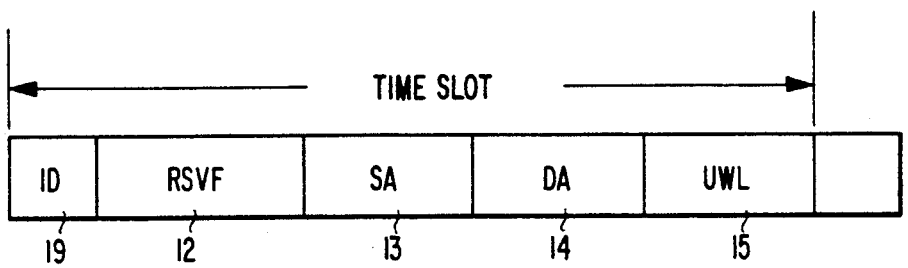
FIG. 2 illustrates the format of the access right control packet.
Figure 3:
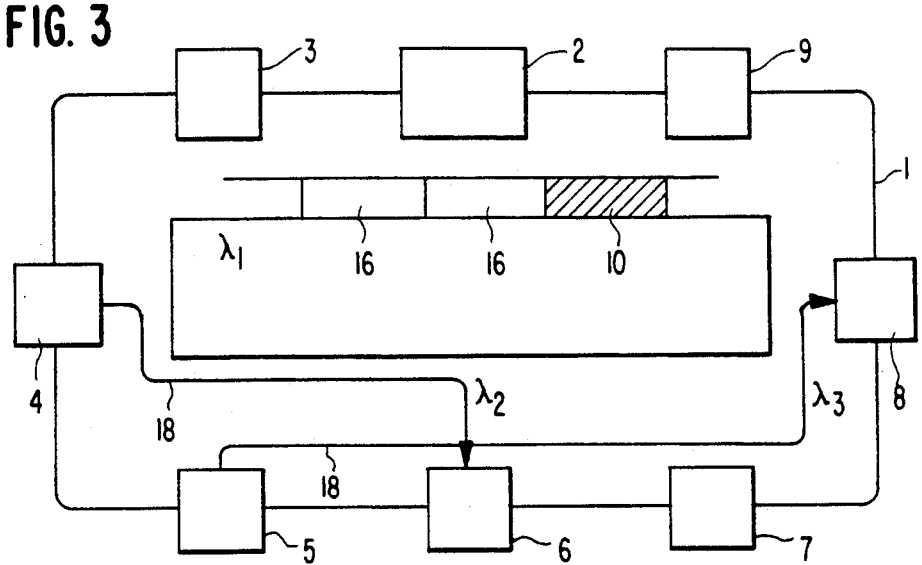
FIG. 3 is a diagram for explaining the principle of a composite media access method, which is a second aspect of the invention.
Figure 4:
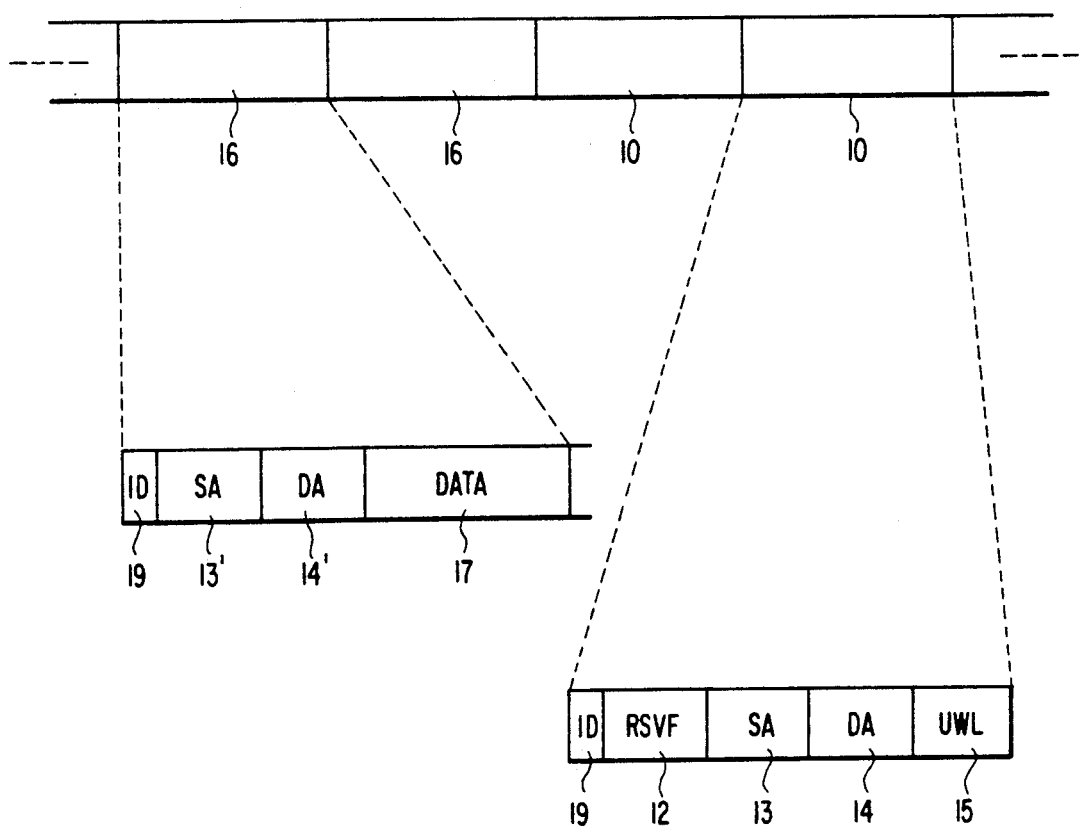
FIG. 4 illustrates the format of a packet exchanging packet.

The present invention will now be described with reference to the accompanying drawings. FIGS. 1A through 1J illustrate the principle of a line exchange type media access method of a wavelength division multiplex system, which is a first aspect of the present invention, and FIG. 2 illustrates the frame composition of an access right control packet. FIG. 3 is a diagram for explaining the principle of a composite media access method, which is a second aspect of the invention, combining packet exchange and line exchange by wavelength division multiplexing, and FIG. 4 illustrates one example of frame composition used in the composite media access method combining packet exchange and line exchange by wavelength division multiplexing according to the invention.

First will be described the media access method for line exchange by wavelength division multiplexing, which constitutes a part of the present invention, with reference to FIGS. 1A through 1J and 2. An access right control packet 10, shown in FIG. 2, is circulating over the transmission path by a first optical wavelength $\lambda 1$, and transmission and reception sequentially take place between all ordinary nodes 2 through 9 (FIG. 1A). As illustrated in FIG. 2, the access right control packet 10 consists of a plurality of time slots, each including a reservation field (RSVF) 12, a send node address (SA) field 13, a destination node address (DA) field 14 and a used wavelength designation (UWL) field 15. The RSVF 12 can assume one of seven statuses including "vacant", "transmit reserve", "transmit permit", "receive permit" "transmit", "end" and "end confirm". At the top of this access right control packet 10 is provided a packet identifier field (ID) 19 for distinguishing this packet from a packet exchanging packet to be described below.

Figure 1C:
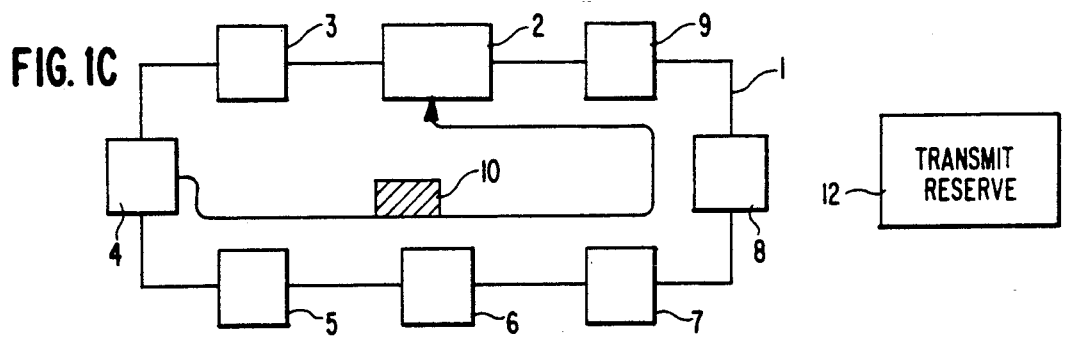
Figure 1D:
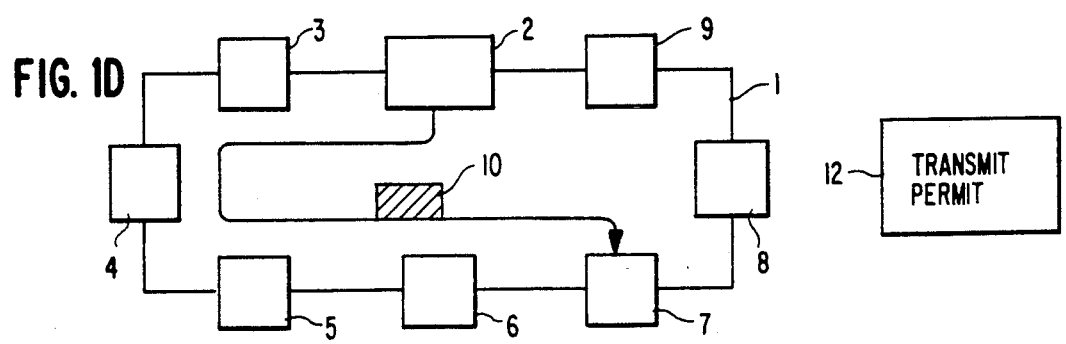

A node from which the transmission of data is desired (which is supposed to be the node 4 here), upon receiving the circulating access right control packet 10 (FIG. 1B), writes "transmit reserve" into the reserve field of a vacant time slot, at the same time writes the addresses of the send node and the designation node into the SA and DA, respectively, and sends out the packet 10 (FIG. 1C). When the access right control packet 10, which has been sent, arrives at the supervisory node 2 and the transmit reservation is confirmed, the supervisory node 2 checks the status of the destination node (which is supposed to be the node 7 here) and, unless the node 7 is receiving data, selects a currently unused one out of the second through Nth optical wavelengths ($\lambda 2$ through $\lambda N$). The supervisory node 2 rewrites the status of the reservation field from "transmit reserve" to "transmit permit", writes the selected wavelength information $\lambda i$ into the UWL field 15, and sends out the packet (FIG. 1D). When the access right control packet 10, whose reservation field has been rewritten from "transmit reserve" to "transmit permit" by the supervisory node 2, arrives at the destination node 7, the destination node 7 can confirm that it has been designated as the receive node by reading the DA field 14. Then the DA node 7, after performing a setting to take into itself only the optical wavelength written in the UWL field 15 and letting all other wavelengths pass as optical signals, rewrites the reservation field from "transmit permit" to "receive permit", and sends out the access right control packet 10 (FIG. 2E). Upon arrival of the access right control packet 10, the send node 4 rewrites the reservation field in the access right control packet 10 from "receive permit" to "transmit", and sends out the access right control packet 10, whose reservation field has been so rewritten. Then, the send node 4 sends out data 11 by the optical wavelength $\lambda i$ written into the UWL field 15. Since only the destination node 7 is set to take the designated wavelength into itself at this time, data transfer can be accomplished between the nodes 4 and 7.

Figure 1I:
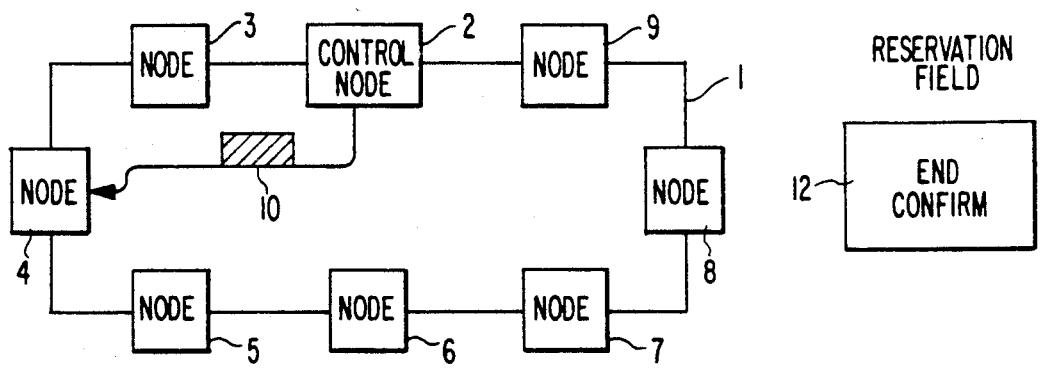
Figure 1J:
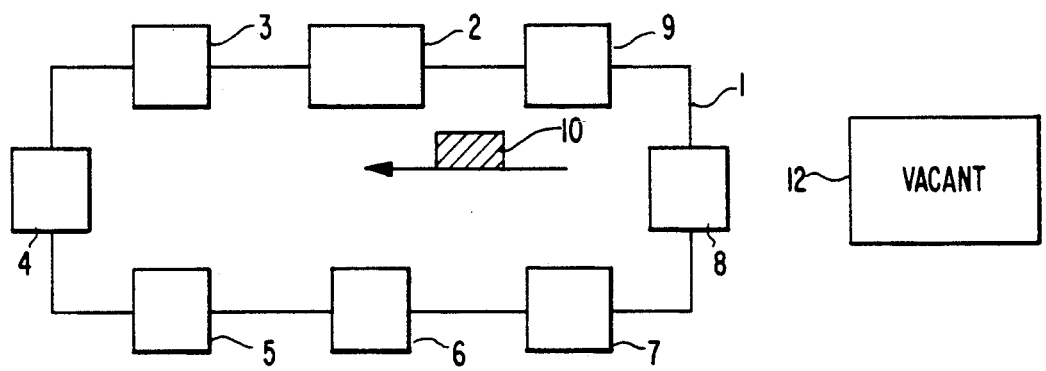

The send node 4 rewrites the reservation field of the access right control packet 10 from "transmit" to "end", and sends out the packet 10 (FIGS. 1G and 1H). The destination node 7, upon receiving the access right control packet 10 whose reservation field has the status of "end", releases the setting of the data reception state, in which only the optical wavelength written in the UWL field 15 is taken into itself and all other wavelengths are let pass as optical signals. The supervisory node 2, receiving this access right control packet 10, confirms the end of transmission and, after releasing the designated optical wavelength for use by another round of data transfer, sends out the access right control packet 10, whose reservation field has been rewritten to "end confirm" (FIG. 1I). Upon arrival of the access right control packet 10 in that state, the send node 4 makes its reservation field "vacant" and sends out the packet 10 on the transmission path (FIG. 1J).

If a data transfer request arises between other nodes while the above described data transfer is under way, data transmission will be accomplished in the same procedure by using another vacant slot in the access right control packet 10 and another optical wavelength than what are used in the ongoing transfer.

Next will be described the media access method by packet exchange according to the present invention with reference to FIG. 3 and 4. Here is taken up as an example a slotted loop system. A plurality of packet exchanging packets 16, illustrated in FIG. 4, are circulating over the transmission path by the first optical wavelength $\lambda 1$, and transmission and reception are supposed to sequentially take place between all the ordinary nodes 2 through 9. The procedure of data transmission and reception here is that a node to transmit data writes the SA and the DA in a vacant packet and sends out the packet, while a node to receive data constantly reads the DA field 14 of every packet arriving at it and, if the DA field 14 coincides with its own address, receives that packet.

Packet exchange in the practice of the present invention can also be performed by the token passing method described in the Proceedings of IEEE, Vol. 77, No. 2, February 1988, pp. 238-256.

It was already stated that some of the plural packets 16 shown in FIG. 4 may as well be used as the access right control packets 10 for media access by wavelength division multiplex line exchange, shown in FIG. 2. They are used for communication for access right control between the supervisory node 2 and other nodes 3 through 9 in media access by wavelength division multiplex line exchange, described with reference to FIGS. 1 and 2. Whether a given packet is a packet 16 for sending packet exchange data or an access right control packet 10 for line exchange is determined according to the packet ID field 19 provided in each packet. The supervisory node 2 performs frame alignment. When creating a frame, the supervisory node 2 sends out a vacant packet in whose ID field 19 is written whether it is a packet for sending data or an access right control packet, and other nodes 3 through 9 use this vacant packet after identifying its type by reading its packet ID field 19.

Next will be described examples of node configuration for realizing the media access method according to the invention. FIG. 5 illustrates the configuration of the supervisory node 2 and FIG. 6, that of the other nodes 3 through 9. The supervisory node 2 has a wavelength assign control circuit 32 in addition to the node configuration of the other nodes 3 through 9 shown in FIG. 6. In FIGS. 5 and 6, reference numerals 20 and 21 denote wavelength division multiplex (WDM) couplers; 22, an optical-to-electric (O/E) converter; 23, an electric-to-optical (E/O) converter; 24, a packet exchanging media access control (PACKET EXCH MAC) citcuit; 25, an E/O converter having a variable-wavelength light source; 26, an O/E converter; 27, a line exchanging media access control (LINE EXCH MAC) circuit; 28, a wavelength selector switch; 29, an interface with an extra-node terminal; 32, the wavelength assign control circuit; and 33, a terminal. Further in FIG. 4, 34 denotes a PACKET EXCH MAC, and 37, a LINE EXCH MAC, both for the nodes 3 through 9.

First will be described the passing of optical signals in the supervisory node 2. Out of the first through Nth optical wavelengths ($\lambda 1 - \lambda N$), only the first optical wavelength $\lambda 1$ is branched by the WDM coupler 20 from other optical wavelengths ($\lambda 2 - \lambda N$). The optical wavelength $\lambda 1$ is converted into an electrical signal by the O/E converter 22 and, after being processed for the leading of the signal into this node, the insertion of the signal into other nodes and handling by the access right control packet, converted into an optical signal by the E/O converter 23, whose output is coupled with other optical wavelengths ($\lambda 2 - \lambda N$), which are supplied from the wavelength selector switch 28, by the WDM coupler 21 to be outputted outside the node.

The optical wavelengths ($\lambda 2 - \lambda N$) branched by the WDM coupler 20 are inputted to a first input terminal of the wavelength selector switch 28. If they include an optical wavelength to be received in this node (which is supposed to be $\lambda j$ here), only that optical wavelength $\lambda j$ is supplied from a second output terminal of the wavelength selector switch 28. Other optical wavelengths than $\lambda j$ are supplied from a first output terminal of the wavelength selector switch 28. The optical wavelengths supplied from the first output terminal are coupled by the WDM coupler 21 with the optical wavelength $\lambda 1$ from the E/O converter 23, and outputted outside the node. The optical wavelength $\lambda j$ supplied from the second output terminal is converted into an electric signal by the O/E converter 26, and sent via the interface 29 to the terminal 33 outside the node. If there is any line exchange data to be sent to the node at this time, data 217 sent from the terminal 33 and having passed the interface 29 is converted into a signal of an optical wavelength (supposed to be $\lambda i$ here) designated by the E/O converter 25 having a variable-wavelength light source, and supplied to a second input terminal of the wavelength selector switch 28. This signal of the wavelength $\lambda i$ is coupled with other optical wavelengths ($\lambda 2 - \lambda N$), further coupled with the first optical wavelength $\lambda 1$ by the WDM coupler 21, and outputted outside the node.

The passing of optical signals and the operation of optical elements in other nodes than the supervisory node, i.e. those illustrated in FIG. 6, are exactly the same.

Figure 7:
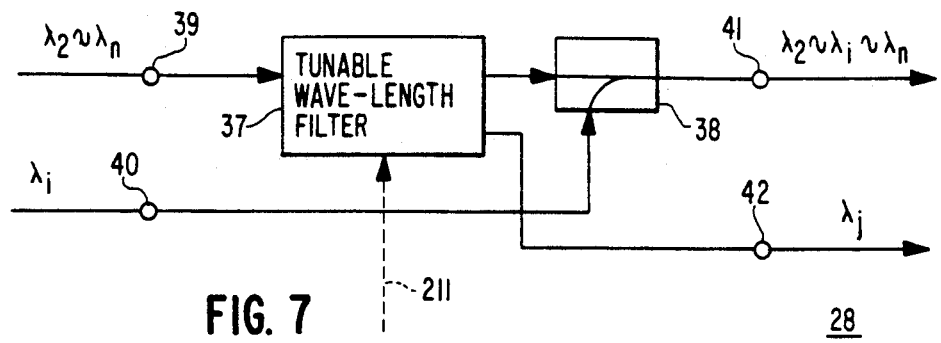
FIG. 7 illustrates the configuration of a wavelength selector switch.

Next will be described how the wavelength selector switch 28, which comprises a tunable wavelength optical filter 37 and an optical coupler 38 as illustrated in FIG. 7. The tunable wavelength optical filter 37 supplies, out of a plurality of optical wavelengths ($\lambda 2 - \lambda N$) entered from a first input 39, only a wavelength ($\lambda j$) designated by a control signal 211, supplied by the LINE EXCH MAC circuit 27, to the O/E converter 26 of FIG. 5 or 6 via a second output terminal 42, and other wavelengths than $\lambda j$ to the WDM coupler 21 of FIG. 5 or 6 via a first output terminal 41. The optical coupler 38 couples the entered wavelength ($\lambda i$) with the wavelengths ($\lambda 2 - \lambda N$) entered from the first input 39, and supplies the coupled wavelength from the first output 41.

As the tunable wavelength optical filter 37, what is described either in the article on "A Variable-Wavelength Optical Filter Using Acoustooptic Effects" in Preliminary Papers for the 1989 European Conference on Optical Communication, Vol. 3, pp. 70-73or in the Japanese Patent Gazette 56-30116 can be used.

Further will be described, with reference to FIGS. 8 through 12 as well, the internal configurations of the PACKET EXCH MAC 24 for the supervisory node 2, PACKET EXCH MAC 34 for other nodes 3 through 9, the LINE EXCH MAC 27 for wavelength multiplex transfer, and the interface 29.

Figure 8:
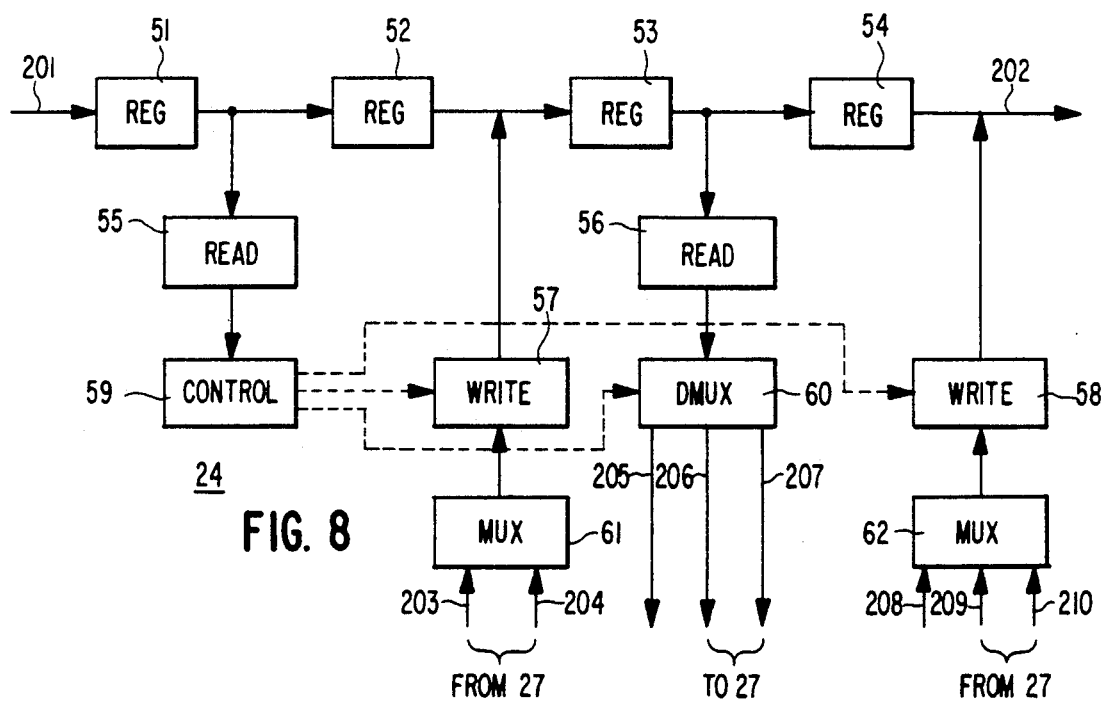
FIG. 8 illustrates the configuration of a media access control (MAC) circuit for packet exchange in the supervisory node.

FIG. 8 illustrates an example of the configuration of the PACKET EXCH MAC 24 for the supervisory node 2, which consists of four registers 51 through 54, a header read circuit 55, a data read circuit 56, a header write circuit 57, a data write circuit 58, a control circuit 59, a demultiplexer 60, and two multiplexers 61 and 62.

Figure 11:
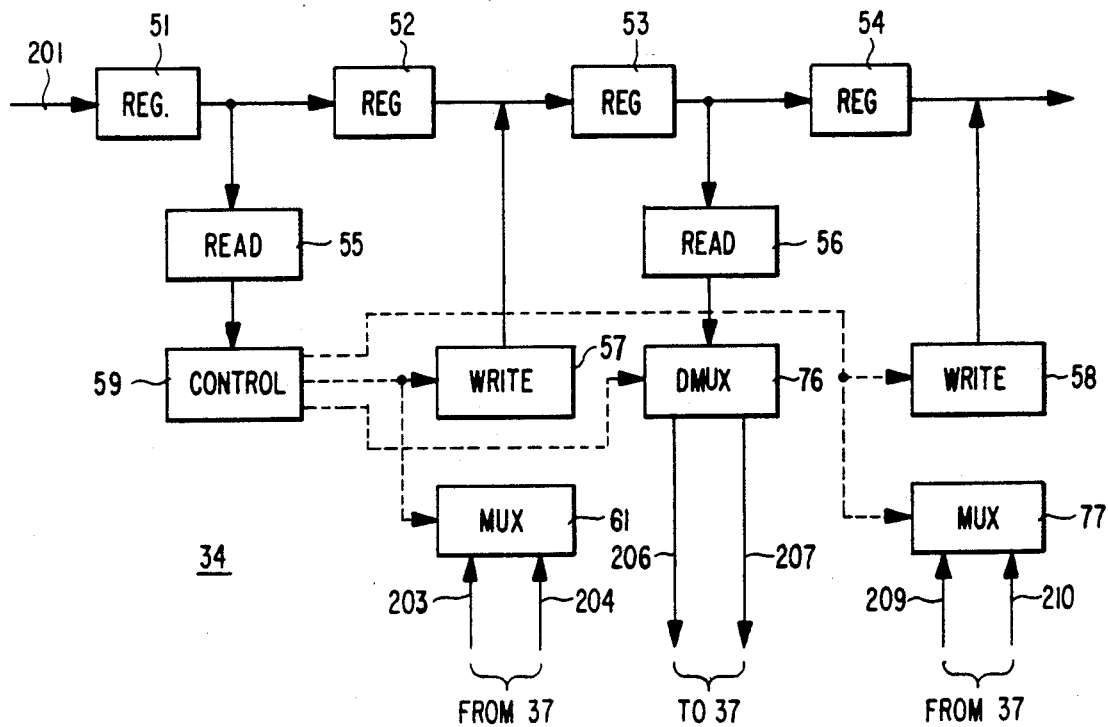
FIG. 11 illustrates the configuration of a media access control (MAC) circuit for packet exchange in an ordinary node.
Figures 12A, 12B:
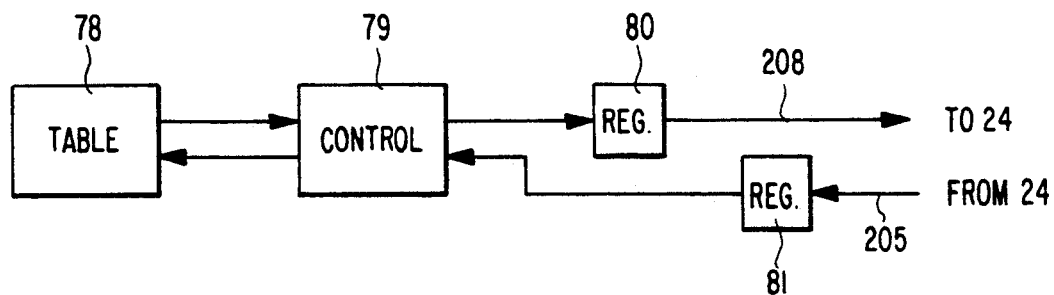
FIGS. 12A and 12B illustrate the configuration of a wavelength assign circuit.

The PACKET EXCH MAC 34 provided in each of the nodes 3 through 9, as illustrated in FIG. 11, has the same configuration as the PACKET EXCH MAC 24 of FIG. 8 except that the three-output demultiplexer 60 is replaced by a two-output demultiplexer 76 and the three multiplexer 62, by a two-input multiplexer 77.

Here, the header read circuit 55 first reads the ID field of the packet to find out whether it is a packet exchanging packet or an access right control packet. If it is a packet exchanging packet, the circuit 55 will then read addresses from the SA and DA fields of that packet, and supplies the addresses to the control circuit 59, which, if the DA field shows the address of its own node, will control the data read circuit 56 and the demultiplexer 60 to lead the data (DATA) field of the received packet exchanging packet into its own node. If the received packet is an access right control packet, the contents of the RSVF, the SA field and the DA field are read out, and supplied to the control circuit 59, which then controls the demultiplexer 60 to read the value of the RSVF into its own node.

The demultiplexer 60, under the control of the control circuit 59, when a packet exchanging packet is entered into its own node, supplies the data section of the packet exchanging packet via a signal line 207 to the LINE EXCH MAC 27 of FIG. 5. When an access right control packet is supplied to its own node, the demultiplexer 60 supplies the value written in its RSVF and the UWL information, designated by the supervisory node, via a signal line 206 to the LINE EXCH MAC 27 of FIG. 5. However, in the supervisory node, if the RSVF indicates "transmit reserve", the demultiplexer 60 will supply the content of this RSVF via a signal line 205 to the wavelength assign control circuit 32 of FIG. 5.

If a vacant packet is detected, the control circuit 59 will control the header read circuit 57 and the data write circuit 58 to permit the writing of the header and data section of the transmit packet supplied from the multiplexers 61 and 62. The multiplexer 61 will supply the header write circuit 57 with the header of the access right control packet supplied via a signal line 203 if an access right control packet is to be outputted, or with the header of the packet exchanging packet supplied via a signal line 204 if a packet exchanging data packet is to be outputted. The multiplexer 62, when its own node is to output a packet exchanging packet, supplies the data section of the packet exchanging packet, supplied via a signal line 210, to the data write circuit 58. The multiplexer 62, when the supervisory node is to supply UWL data to the access right control packet, supplies the data write circuit 58 with wavelength designation data supplied via a signal line 208. Further the multiplexer 62, when its own node requests data transmission by line exchange, i.e. when "transmit reserve" is to be written into the RSVF of the access right control packet, supplies the data write circuit 58 with a signal indicating "transmit reserve" supplied via a signal line 209.

Figure 9:
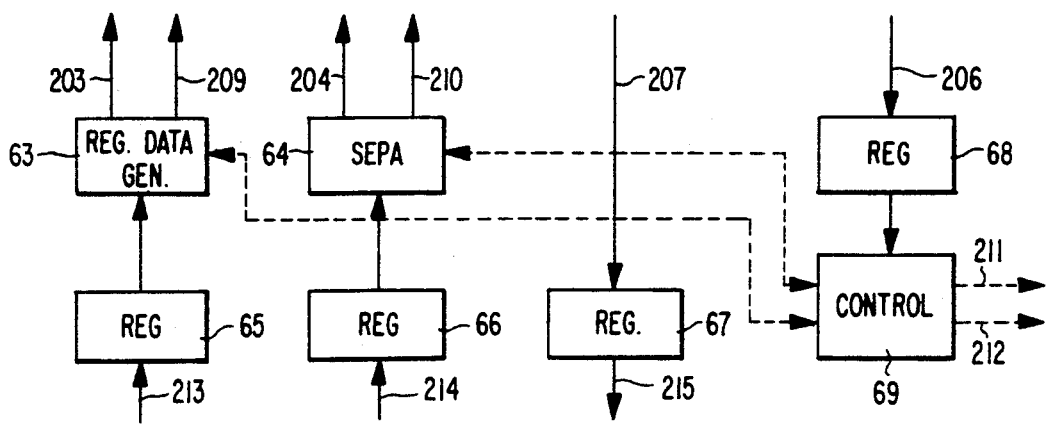
FIG. 9 illustrates the configuration of a media access control (MAC) circuit for line exchange.

FIG. 9 illustrates an example of the composition of the MAC 27 for line exchange by wavelength-division multiplexing, which consists of a requested data generator circuit 63, a header/data separator circuit 64 for separating the data section and the header to send data by packet exchange to the PACKET EXCH MAC 24, four registers 65 through 68, and a network control circuit 69 for line exchange by wavelength-division multiplexing. The network control circuit 69 for line exchange by wavelength-division multiplexing performs the control of the request data generator circuit 63 and the header/data separator circuit 64. It also controls the oscillating frequency of the E/O converter 25 having a variable-wavelength light source, shown in FIG. 5, via a signal line 212 and the wavelength to be selected by the wavelength selector switch 28, also shown in FIG. 5, via a signal line 211.

If, here, a packet exchanging packet has been sent from the interface 29 via a signal line 214, the header/data separator circuit 64 will separate that packet exchanging packet into its header and data, which are respectively outputted to the signal lines 204 and 210 for supply to the multiplexers 61 and 62 of the PACKET EXCH MAC 24 of FIG. 8.

If a data transfer request has been sent from the interface 29 to the request data generator circuit 63 via a signal line 213 and the register 65, the request data generator circuit 63 will generates the header of the access right control packet, and send it to the multiplexer 61 of the PACKET EXCH MAC 24 of FIG. 8 via the signal line 203. However, a signal denoting "transmit reserve" is sent to the PACKET EACH MAC via the signal line 209.

If the data section of the packet exchanging data received from the PACKET EXCH MAC via the signal line 207 has been sent, this data section is sent to the interface via the register 67 and a signal line 215. If UWL information has been sent from the PACKET EXCH MAC via the signal line 206, this UWL information will be supplied to the network control circuit 69 via the register 68. Then the network control circuit 69 will supply a signal for controlling the wavelength to be selected by the wavelength selector switch 28 of FIG. 5 and a signal for controlling the output wavelength of the E/O converter 25 via the signal lines 211 and 212, respectively.

Figure 10:
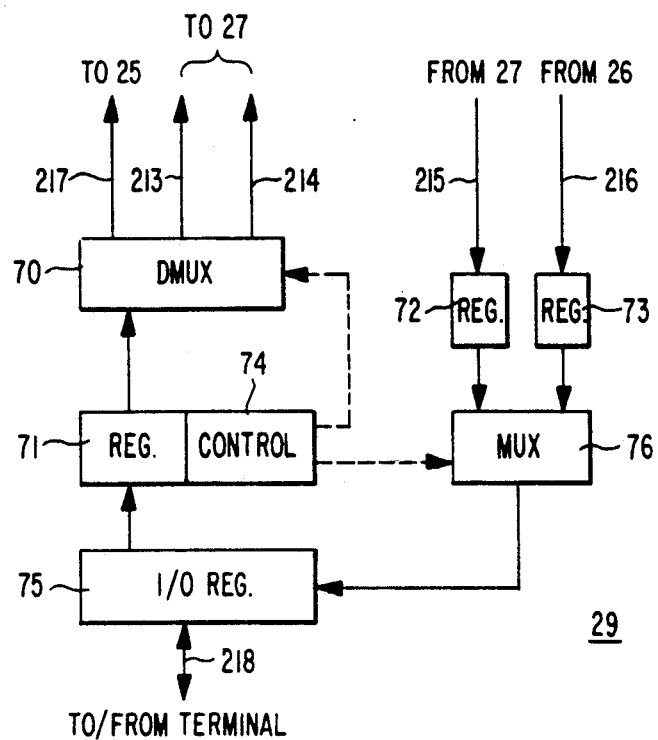
FIG. 10 illustrates the configuration of an interface circuit.

FIG. 10 illustrates an example of the configuration of the interface 29, which consists of a demultiplexer 70, three registers 71 through 73, a control circuit 74, an I/O register 75 and a multiplexer 76.

Here, if transmit data and a header have been sent from the terminal 33 via a signal line 218, the data will be sent to the LINE EXCH MAC 27 via the register 71, the demultiplexer 70 and the signal line 214. If receive data for packet exchange have come from the LINE EXCH MAC 27 via the signal line 215, the receive data will be sent to the terminal via the register 72, the multiplexer 76 and the I/O register 75. If a transmit request for wavelength multiplex line exchange has come from the terminal via the signal line 218, the transmit request will be sent to the LINE EXCH MAC 27 via the I/O register 75, the register 71, the demultiplexer 70 and the signal line 213. If transmit data for wavelength multiplex line exchange have arrived, the transmit data will be sent to the E/O converter 25 having a variable-wavelength light source via the I/O register 75, the register 71, the demultiplexer 70 and the signal line 217. Further, if receive data for wavelength multiplex line exchange have come from the O/E converter 26 of FIG. 5 via a signal line 216, the receive data will be sent to the terminal 33 via the register 73, the multiplexer 76, the I/O register 75 and the signal line 218.

Next will be described the configuration of the wavelength assign control circuit 32 to be installed in the supervisory node 2. The wavelength assign control circuit 32, as shown in FIG. 12, consists of a wavelength table 78, a control circuit 79 and two registers 80 and 81, and the wavelength table 78 further comprises a wavelength field 82 in which information representing the second through Nth wavelengths used in the system are written; an I/B field 83 in which is written information indicating whether each wavelength is currently in a busy state, in which it is used for wavelength multiplex line exchange communication, or in an idle state, in which it is not used; a field 84 in which the address of the receive node is written; and a field 85 in which that of the transmit node is written.

The two registers 80 and 81 are connected to the PACKET EXCH MAC 24, and transmit requests coming from other nodes 3 through 9 are conveyed to the control circuit 79 via the signal line 205. Information indicating the wavelength to be used, selected from the wavelength table, is sent to the PACKET EXCH MAC via the signal line 208.

Now will be described, along the flow of operations explained with reference to FIGS. 1A through 1J, the flow of signals in the execution of the media access method by wavelength-division multiplex line exchange according to the present invention.

When an access right control packet 10 is circulating on a loop (FIG. 1A), whether in the supervisory node 2 or any one of the other nodes 3 through 9, the access right control packet 10 sent at the first optical wavelength λ1 is branched by the WDM coupler 20 in the node, and converted into an electric signal by the O/E converter 22. This electric signal enters the PACKET EXCH MAC 24 for the supervisory node 2 or the PACKET EXCH MAC 34 for one of the nodes 3 through 9, and is supplied to the E/O converter 23 via the registers 51 through 54 of FIG. 8. It is converted by the E/O converter 23 into an optical signal and outputted, followed by the repetition of the operation to supply this signal out of the node via the WDM coupler 21.

Suppose here that a data transmit request has arisen in the node 4. Thus the data transmit request from a terminal connected to the node 4 is supplied to the signal line 218, and this request is entered into the register 71 via the I/O register 75 of FIG. 10. The control circuit 74 of FIG. 10 confirms the arrival of the transmit request, and sends it from the demultiplexer 70 to the LINE EXCH MAC 27 via the signal line 213. In the LINE EXCH MAC 27, when the register 65 of FIG. 9 receives that transmit request, the request data generator circuit 63 generates request data, which are sent to the header write circuit 57 via the signal line 203 and the multiplexer 61 in the PACKET EXCH MAC 34 for the nodes 3 through 9.

Then the header read circuit 55, when an access right control packet has arrived at it, reads the RSVF in each time slot. If it finds a time slot whose RSVF is "vacant", the header write circuit 57 will write "transmit reserve" in the RSVF, the address of the node 4 in the SA field and the DA (which is supposed to be 7 here) in the DA field of that time slot. The access right control packet, into one of whose time slots has been written "transmit reserve", is converted by the E/O converter 23 of FIG. 6 into an optical signal of the first optical wavelength λ1 after having passed the registers 53 and 54, and the converted signal is outputted outside the node via the WDM coupler 21. In this way are achieved the operations from FIG. 1B to FIG. 1C.

The time slot whose RSVF has been once rewritten by one of the nodes 3 through 9 (the node 4 here) from "vacant" to "transmit reserve" cannot permit access from any other node than the transmit and receive nodes (4 and 7 here) and the supervisory node 2 until its RSVF is rewritten to "vacant" (corresponding to the operations from FIG. 1B to FIG. 1C).

The access right control packet, which has been sent out with "transmit reserve" written into one of its time slots by the node 4, passes the nodes 5 through 9 as illustrated in FIG. 1C, and arrives at the supervisory node 2. At this time in the supervisory node 2 shown in FIG. 5, the access right control packet, having passed the WDM coupler 20 and the O/E converter 22 and been converted into an electric signal, is entered into the PACKET EXCH MAC 24 for the supervisory node. Then the header read circuit 55 shown in FIG. 8 reads the RSVF of the access right control packet converted into the electric signal, and confirms the "transmit reserve" status written by the node 4. This confirmative information is conveyed to the control circuit 79 in the wavelength assign control circuit 32, shown in FIG. 12A, via the signal line 205. The control circuit 79 selects one of the currently unused wavelengths (which is supposed to be λj here) out of the wavelength table 78. A signal representing the selected wavelength is sent to the PACKET EXCH MAC 24 for the supervisory node, illustrated in FIG. 8, via the register 80 of FIG. 12A and the signal line 208. In the PACKET EXCH MAC 24, this signal representing the used wavelength is sent from the multiplexer 62 to the data write circuit 58. In this manner, the wavelength designated by the supervisory node is written into the UWL field of the access right control packet. At this time, in the PACKET EXCH MAC 24, the data read circuit 56 reads the contents of the SA field and the DA field, and sends them from the register 81 of the wavelength assign control circuit 32 to the control circuit 79 via the signal line 205. Then the control circuit 79 makes "busy" the λj position in the wavelength table, from which the selection was made, and also writes the address of the transmit node 4 and the receive node 7 into that position. Then the data write circuit 58 of FIG. 8, at the instruction of the control circuit 59, rewrites the content of the RSVF from "transmit reserve" to "transmit permit". It also writes λj into the UWL field. Then the access right control packet passes the signal line 202, the E/O converter 23 and the WDM coupler 21, and is sent out of the supervisory node 2. In this way are realized the operations from FIG. 1C to FIG. 1D. Here, the delay time resulting from the selection of λj by the wavelength assign control circuit 32 is absorbed by the registers 52, 53 and 54 in the PACKET EXCH MAC 24 shown in FIG. 8.

The access right control packet sent out of the supervisory node 2 passes the nodes 3 through 6, and arrives at the receive node 7 (FIG. 1D). In the node 7, the access right control packet passes the WDM coupler 20 and the O/E converter 22 of FIG. 6, and goes to the PACKET EXCH MAC 34 in this node 7. In the PACKET EXCH MAC 34 for the node illustrated in FIG. 11, the header read circuit 55 reads the RSVF of each time slot and, upon confirmation of the "transmit permit" status written by the supervisory node 2 and the address of its own node written in the DA field, the data read circuit 56 reads λj, which is the content written in the UWL field, and conveys that information (λj) from the demultiplexer 76 to the register 68 and the control circuit 69 of the LINE EXCH MAC 27 of FIG. 9 via the signal line 206. The control circuit 69 sends a control signal to the wavelength selector switch 28 of FIG. 6 via the signal line 211, and accomplishes the setting to supply only λj out of the wavelengths from the input terminal 1 of the wavelength selector switch 28 to the output terminal 2 and all other wavelengths to the output terminal 1.

Afterwards, the header write circuit 57 of the PACKET EXCH MAC 34 (FIG. 6) in the node 7 rewrites the content of the RSVF from "transmit permit" to "receive permit" at the instruction of the control circuit 59. Then the access right control packet, in which the RSVF of one of the time slots has been rewritten to "receive permit", is sent out of the node 7 via the registers 53 and 54, the E/O converter 23 and the WDM coupler 21. In this way are performed the operations from FIG. 1D to FIG. 1E.

The access right control packet, in which the RSVF of one of the time slots has been rewritten from "transmit permit" to "receive permit", passes the nodes 8 and 9, the supervisory node 2 and the node 3, and arrives at the node 4, which is the transmit node (FIG. 1E). The access right control packet goes to the PACKET EXCH MAC 34 in the node 4 via the WDM coupler 20 and the O/E converter 22 (see FIGS. 6 and 11). The header read circuit 55 of FIG. 11 reads the RSVF of each time slot and, upon confirmation of the "receive permit" earlier written by the node 7 and information (λj) written into the UWL field, the data read circuit 56 reads λj, which is the content of UWL field, and conveys that information (λj) from the demultiplexer 76 to the register 68 and the control circuit 69 of the LINE EXCH MAC 27 of FIG. 9 via the signal line 206. The control circuit 69 sends the control signal 211 to the E/O converter 25 having a variable-wavelength light source via the signal line 212, and accomplishes the setting to make the oscillating frequency λj. After that, the header write circuit 57 of FIG. 11, at the instruction of the control circuit 59, rewrites the content of the RSVF from "receive permit" to "transmit". Then the access right control packet in which the RSVF of one of the time slots has been rewritten to "transmit" is sent out of the node 4 via the registers 53 and 54, the E/O converter 23 and the WDM coupler 21, both of FIG. 6.

After that, line exchange data are sent from the terminal 33 connected to the node 4 to the E/O converter 25 having a variable-wavelength light source via the signal line 218, the register 71, the demultiplexer 70, both in the interface 29 illustrated in FIG. 10, and the signal line 217. There the data are converted into an optical signal of λj in wavelength, which goes from the input 2 to the output 1 of the wavelength selector switch 28, and is outputted from the node 4 via the WDM coupler 21. In this manner are achieved the operations from FIG. 1E to FIG. 1F.

The signal sent out from the node 4 at the wavelength o of λj passes as an unchanged optical signal, without being converted into an electric signal, the route of the WDM coupler 20, the first input terminal to the first output terminal of the wavelength selector switch 28 and the WDM coupler 21 in the nodes 5 and 6, and arrives at the node 7, which is the receive node (FIG. 1F). In the node 7, the signal passes the WDM coupler 20 and is inputted to the first input terminal of the wavelength selector switch 28. As mentioned above, at this time, the wavelength selector switch 28 of the node 7 is so set as to supply only j, out of the input wavelengths, to the O/E converter 26, and all other wavelengths to the WDM coupler 21. Accordingly, the signal at the wavelength of λj is converted by the O/E converter 26 into an electric signal, which is sent to the register 73 in the interface circuit 29 of FIG. 10 via the signal line 216. The output of the register 73 is sent from the multiplexer 76 to a terminal connected to the node 4 via the I/O register 75 and the signal line 218. At this time, data communication takes place between the transmit node 4 and the receive node 7 over a line of λj in wavelength. In this way is performed the operation of FIG. 1F.

Upon completion of data transmission from the terminal of the transmit node 4, the E/O converter 25 having a variable-wavelength light source of the node 4, illustrated in FIG. 6, releases the setting of "the oscillating wavelength to λj" at an instruction given from the control circuit 69 in the LINE EXCH MAC 27 via the signal line 212. The wavelength selector switch 28 of the receive node 7 releases the setting "to supply only λj, out of the wavelengths from the input terminal 1, to the output terminal 2 and all other wavelengths to the output terminal 1" at an instruction given from the control circuit 69 in the LINE EXCH MAC 27 via the signal line 211.

Afterwards, upon arrival of the circulating access right control packet at the transmit node 4 (FIG. 1G), it then goes to the PACKET EXCH MAC 34 (FIG. 11) in the node 4 via the WDM coupler 20 and the O/E converter 22, both of FIG. 6. The header read circuit 55 of FIG. 11 reads the RSVF of each time slot and, upon confirmation of the "transmit" earlier written by its own node 4, the header write circuit 57 rewrites the content of the RSVF from "transmit" to "end" at the instruction of the control circuit 59. Then the access right control packet 10 in which the RSVF in one of the time slots is rewritten to "end" is sent out of the node 4 via the registers 53 and 54, the E/O converter 23 and the WDM coupler 21. In this manner are performed the operations from FIG. 1G to FIG. 1H.

The access right control packet, which has been sent out with "end" written into its RSVF by the node 4, passes the nodes 5 through 9 and arrives at the supervisory node 2 (FIG. 1H). At this time in the supervisory node 2, the access right control packet having passed the WDM coupler 20 and the O/E converter 22, both of FIG. 5, is fed to the PACKET EXCH MAC 24 for the supervisory node. In the PACKET EXCH MAC 24 for the supervisory node, shown in FIG. 8, the header read circuit 55 reads the RSVF of the access right control packet and, upon confirmation of the "end" written by the node 4, the control circuit 79 in the wavelength assign control circuit 32, shown in FIG. 12A, makes "idle" the I/B position corresponding to the λj set in the wavelength table 78, and also deletes the address representing the transmit node 4 and that representing the receive node 7 written in the SA and DA fields 84 and 85, respectively. Then the data write circuit 58 in the PACKET EXCH MAC 24 for the supervisory node, shown in FIG. 8, rewrites the content of the RSVF from "end" to "end confirm" at the instruction of the control circuit 59. The access right control packet in which the RSVF has been rewritten is sent out of the supervisory node 2 via the signal line 202, the E/O converter 23 and the WDM coupler 21, both of FIG. 5. In this way take palce the operations from FIG. 1H to FIG. 1I.

The access right control packet sent out of the supervisory node 2 passes the node 3 and arrives at the transmit node 4, where the access right control packet goes to the PACKET EXCH MAC 34 in the node 4 via the WDM coupler 20 and the O/E converter 22, both of FIG. 6. In the LINE EXCH MAC for the node, shown in FIG. 10, the header read circuit 55 reads the RSVF of the access right control packet and, upon confirmation of the "end confirm" earlier written by the supervisory node 2, the data write circuits 57 and 58 write "vacant" information into the RSVF, the SA field, the DA field and the UWL field of the access right control packet at the instruction of the control circuit 59. Then all the time slots in the access right control packet, so far secured for communication between the nodes 4 and 7, are made "vacant", and the packet is sent out of the node 4 via the signal line 202, the E/O converter 23 and the WDM coupler 21, both of FIG. 6. In this manner are accomplished the operations from FIG. 1I to FIG. 1J.

Although only the access right control packet 10 was supposed in the foregoing description to be transferred at the first optical wavelength λ1, as already stated, a packet exchanging packet used for packet exchange communication is also transferred at the wavelength λ1. Distinction between the access right control packet and the packet used for data communication by packet exchange is made by reading the packet ID field at the top of each packet. This function is realized for both the supervisory node 2 and other nodes 3 through 9 by the header read circuit 55 and the control circuit 59 in the PACKET EXCH MAC 24 for the supervisory node or the PACKET EXCH MAC 34 for the nodes 3 through 9, whichever is applicable.

As hitherto described, since the composite media access method combining packet exchange and line exchange by wavelength-division multiplexing according to the present invention makes it possible, by using a plurality of optical wavelengths, to have two media access methods including one by packet exchange and the other by line exchange by wavelength-division multiplexing, there is no possibility for the transfer capacity of either method to decrease. Further, as the line exchange uses a wavelength-division multiplex system, the transfer rate of each channel is dependent neither on the transfer rate of another channel nor on that of packet exchange but can be freely set, enabling the transfer rate to be increased as required.

What is claimed is:

1. A media access method for use in an optical local area network (LAN) system having a plurality of nodes including a supervisory node and an optical fiber transmission path for data transmission between said nodes, and performing data transmission by a wavelength-division said nodes, and method using N optical wavelengths, wherein the transmission and reception of data takes place in the following manner:

transferring an access right control packet, comprised of a reservation field in which is written transmit reserve information indicating the presence of a data transmission request, a send address field in which is written a send node address, a destination address field in which is written a receive node address and a used wavelength field in which is written a used wavelength information for notifying the nodes of the optical wavelength to be used for data transmission, at a first optical wavelength between nodes;

notifying said supervisory node and said receive node of the presence of a data transmission request, when a node is to transmit data, by writing into said access right control packet said transmit reserve information, the send node's own address, and the address of the receive node to which the data are to be sent, and sending the packet;

said supervisory node, upon perception of said data transmission request from said send node and unless said receive node to which the data are to be sent is receiving data, selecting one transmit optical wavelength out of the second through Nth optical wavelengths, writing the selected wavelength into said access right control packet as said used wavelength information, sending said packet, and thereby notifying said send and receive nodes of said transmit optical wavelength;

said send node transmitting the data using the transmit optical wavelength of which said send node has been notified, said receive node receiving only said transmit optical wavelength letting all other wavelengths pass as optical signals;

further transferring a packet exchanging packet, comprised of an identifier field, a send node address field, a receive node address field and a data section, and another packet exchanging packet, in whose identifier field are written information for distinguishing said access right control packet from said packet exchanging packet, at said first optical wavelength;

each node receiving a packet exchanging packet having a receive node address identical with its own node address; and when transmitting packet exchanging data, a transmitting node sending a packet exchanging packet in which in said send node address field, said receive node address field and said data section are respectively written the transmitting node's own address, the address of the destination node and the packet exchanging data to be transmitted.

* * * * *